(12) United States Patent
Bates et al.

(10) Patent No.: US 9,176,848 B2
(45) Date of Patent: Nov. 3, 2015

(54) PROGRAM DEBUGGER AND PROGRAM DEBUGGING

(71) Applicant: INTERNATIONAL BUSINESS MACHINES CORPORATION, Armonk, NY (US)

(72) Inventors: Cary L. Bates, Rochester, MN (US); Xiao Ling Chen, Beijing (CN); Fan Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/444,446

(22) Filed: Jul. 28, 2014

(65) Prior Publication Data

US 2015/0033211 A1   Jan. 29, 2015

(30) Foreign Application Priority Data

Jul. 29, 2013   (CN) .......................... 2013 1 0322560

(51) Int. Cl.
*G06F 9/44* (2006.01)
*G06F 11/36* (2006.01)

(52) U.S. Cl.
CPC ................................. *G06F 11/3636* (2013.01)

(58) Field of Classification Search
CPC .................................................. G06F 11/3636
USPC .......................................................... 717/129
See application file for complete search history.

(56) References Cited

U.S. PATENT DOCUMENTS

| 3,937,938 | A  | * | 2/1976 | Matthews ....................... 714/46 |
| 6,077,312 | A  | * | 6/2000 | Bates et al. ................... 717/129 |
| 6,079,032 | A  | * | 6/2000 | Peri ............................ 714/38.13 |
| 6,691,246 | B1 | * | 2/2004 | Lin .............................. 714/6.13 |
| 7,043,717 | B2 | * | 5/2006 | Matsumoto et al. .......... 717/124 |
| 7,047,519 | B2 | * | 5/2006 | Bates et al. ................... 717/129 |
| 7,225,431 | B2 | * | 5/2007 | Gschwind et al. ............ 717/129 |
| 7,272,826 | B2 | * | 9/2007 | Bates et al. ................... 717/129 |
| 7,383,538 | B2 | * | 6/2008 | Bates et al. ................... 717/128 |

(Continued)

OTHER PUBLICATIONS

B. Liblit et al. "Building a Better Backtrace: Techniques for Post-mortem Program Analysis", Oct. 2002, Retrieved from <http://theory.stanford.edu/~aiken/publications/papers/backtrace.pdf> pp. 13.*

*Primary Examiner* — Marina Lee
(74) *Attorney, Agent, or Firm* — William A. Kinnaman, Esq.; Matthew M. Hulihan, Esq.; Heslin Rothenberg Farley & Mesiti P.C.

(57) ABSTRACT

Debug information records associated with a weak function of the program are obtained. In response to receipt of an instruction of setting a breakpoint for the weak function in the program, breakpoint addresses corresponding one-to-one with each of the at least one debug information record are obtained. In response to the program being executed to a set breakpoint associated with the weak function, an address to which a program counter of the program points is obtained. A breakpoint address matching the address to which the program counter of the program points is obtained. A mark for the matching breakpoint address is set. In response to receipt of the instruction of setting a breakpoint for the weak function in the program again, a debug information record corresponding to the matching breakpoint address according to the at least one debug information record with the mark being set is obtained.

20 Claims, 7 Drawing Sheets

(56) References Cited

U.S. PATENT DOCUMENTS

| | | | |
|---|---|---|---|
| 7,464,373 B1* | 12/2008 | Yunt et al. | 717/125 |
| 7,735,069 B2* | 6/2010 | Bustelo et al. | 717/129 |
| 7,774,172 B1* | 8/2010 | Yunt et al. | 703/2 |
| 7,987,347 B2* | 7/2011 | Wilson et al. | 712/241 |
| 8,032,868 B2* | 10/2011 | Bates et al. | 717/128 |
| 8,091,075 B2* | 1/2012 | Bates et al. | 717/129 |
| 8,219,980 B2* | 7/2012 | Bates et al. | 717/129 |
| 8,943,480 B2* | 1/2015 | Bates et al. | 717/129 |
| 8,990,780 B2* | 3/2015 | Bates et al. | 717/129 |
| 9,009,679 B2* | 4/2015 | Bates et al. | 717/129 |
| 2002/0174416 A1* | 11/2002 | Bates et al. | 717/128 |
| 2003/0061599 A1* | 3/2003 | Bates et al. | 717/129 |
| 2003/0221188 A1* | 11/2003 | Matsumoto et al. | 717/129 |
| 2003/0225838 A1* | 12/2003 | Bates et al. | 709/206 |
| 2004/0083458 A1* | 4/2004 | Gschwind et al. | 717/129 |
| 2005/0066313 A1* | 3/2005 | Bates et al. | 717/129 |
| 2005/0289396 A1* | 12/2005 | Hooper et al. | 714/34 |
| 2007/0300209 A1* | 12/2007 | Bates et al. | 717/129 |
| 2008/0155236 A1* | 6/2008 | Wilson et al. | 712/241 |
| 2008/0168428 A1* | 7/2008 | Bates et al. | 717/129 |
| 2008/0216054 A1* | 9/2008 | Bates et al. | 717/125 |
| 2012/0110555 A1* | 5/2012 | Bates et al. | 717/129 |
| 2012/0246624 A1 | 9/2012 | Halliday et al. | |
| 2013/0019227 A1* | 1/2013 | Chiu | 717/125 |
| 2013/0152054 A1* | 6/2013 | Bates et al. | 717/129 |
| 2013/0263094 A1* | 10/2013 | Bates et al. | 717/129 |
| 2014/0007058 A1* | 1/2014 | Bates et al. | 717/129 |
| 2014/0229916 A1* | 8/2014 | Bates et al. | 717/124 |
| 2014/0344789 A1* | 11/2014 | Bates et al. | 717/129 |
| 2014/0344790 A1* | 11/2014 | Bates et al. | 717/129 |
| 2015/0033211 A1* | 1/2015 | Bates et al. | 717/129 |

* cited by examiner

```
Date.h
class Date
{
private:
    int m_nMonth;
    int m_nDay;
    int m_nYear;

Date() { } // private default constructor public:
    Date(int nMonth, int nDay, int nYear)
    {
        SetDate(nMonth, nDay, nYear);
    } void SetDate(int nMonth, int nDay, int nYear)
    {
        m_nMonth = nMonth;
        m_nDay = nDay;
        m_nYear = nYear;
    } int GetMonth() { return m_nMonth; }
    int GetDate()  { return m_nDay; }
    int GetYear()  { return m_nYear; }
};
```

Fig. 2

PROGRAM DEBUGGER AND PROGRAM DEBUGGING

PRIOR FOREIGN APPLICATION

This application claims priority from Chinese patent application number 201310322560.4, filed Jul. 29, 2013, which is hereby incorporated herein by reference in its entirety.

BACKGROUND

One or more aspects of the present invention relate to program debugging, and more specifically, to a program debugger and program debugging.

Generally speaking, many programs each is typically composed of a header file (e.g., a header file extension in the C++ language is .h) and a definition file. The header file may serve as a carrier file containing class definitions, functionality functions, and data interface declarations and is mainly used for saving declarations for a program and playing a descriptive role. The definition file is used for saving implementations for a program. Usually, a program's header file contains defined class files, and one class contains class member variables and class member functions.

A program written in an object-oriented programming language that requires compiling and linking to form an executable file experiences the following steps from writing to final running. Firstly, a programmer writes a source program, and then, the programmer compiles the source program using a compiler, translating the source program into an object program in a binary form, wherein the compiling is conducted with a source program file as a unit. One application program might have several source files, therefore several object files or object programs, such as files with the extension of .o will be generated separately by the compiling. Next, the programmer uses a linker or binder to link all object programs resulting from the compiling of one program, system's library files and other information provided by the system to form an executable binary file, such as an .exe file. Finally, the programmer may run the resulting executable binary file, thereby obtaining a running result.

When a header file not only declares a class member function but also defines its implementation, and a compiler compiles a source file containing this header file and calling the member function, the compiler marks this function as a weak symbol (or referred to as a weak function) in a corresponding object file so as to allow multiple source files to call this class member function; otherwise, when a linker links them together, the linker will report an error. For weak functions corresponding to a same function name in multiple object files, the linker selects only one of them as an actually called function when perform the linking. Some linkers remove redundant weak function entities, while others retain all weak function entities. If the implementation of a member function of a class is defined within the class member body, then the member function is usually processed by the compiler into an inline function. However, the linker has to retain multiple weak function entities in order to realize function pointer calling.

A debugger is a tool that can be used for debugging an executable file with debug information, and its main functions are to maintain the program running, view information during the program running, such as register information, stack information, variable information, memory information, etc., and modify a program execution flow. To accomplish these functions, first of all, a running program needs to trigger a breakpoint and then stop. The breakpoint comprises a line number breakpoint and a function breakpoint. When setting a breakpoint, the debugger needs the debug information, which mainly comprises line number entities and debug information entities (DIE, which may take the format of dwarf) describing functions, variables and calling relationships, etc. and the debug information is generated during compiling and assembling.

Since there will be multiple debug information entities and corresponding line number entities for multiple weak functions, although some linkers relocate the debug information and others do not process the debug information, the debug information corresponding to a final executable file will retain debug information entities and corresponding line number entities for multiple weak functions. Then a problem arises: when a debugger sets breakpoints for these class member functions, the debugger has to find the debug information entities of all weak functions and set multiple breakpoints, or when a debugger sets line number breakpoints for class member function entities defined within a header file, the debugger also needs to find all line number entities and set multiple breakpoints. If there are 1000 or more files containing such a header file in a program, the debugger has to find 1000 or more debug information entities or line number entities and set 1000 or more breakpoints. When setting the same breakpoint again, the debugger repeats the effort to find 1000 or more debug information entities or line number entities and set multiple breakpoints.

BRIEF SUMMARY

To solve the above-described problems, a new program debugger and a program debugging method are provided in one or more aspects.

According to one aspect of the present invention, there is provided a processor-implemented debugging method, comprising: obtaining at least one debug information record associated with a weak function of the program; obtaining breakpoint addresses corresponding one-to-one with each of the at least one debug information record according to the obtained at least one debug information record associated with the weak function of the program, in response to receipt of an instruction of setting a breakpoint for the weak function in the program; obtaining an address to which a program counter of the program points, in response to the program being executed to a set breakpoint associated with the weak function; obtaining a breakpoint address matching the address to which the program counter of the program points, from the breakpoint addresses corresponding one-to-one with each of the at least one debug information record; setting a mark for the matching breakpoint address in the at least one debug information record associated with the weak function of the program; and obtaining a debug information record corresponding to the matching breakpoint address according to the at least one debug information record with the mark being set, in response to receipt of the instruction of setting a breakpoint for the weak function in the program again.

According to another aspect of the present invention, there is provided a program debugger, comprising: a memory and a processor in communication with the memory, the program debugger being configured to perform a method. The method comprises obtaining a at least one debug information record associated with a weak function of a program; obtaining breakpoint addresses corresponding one-to-one with each of the at least one debug information record according to the obtained at least one debug information record associated with the weak function of the program, in response to receipt of an instruction of setting a breakpoint for the weak function in the program; obtaining an address to which a program counter of the program points, in response to the program being executed to a set breakpoint associated with the weak function; obtaining a breakpoint address matching the address to which the program counter of the program points, from the breakpoint addresses corresponding one-to-one with each of the at least one debug information record; and setting a mark for the matching breakpoint address in the at least one debug information record associated with the weak function of the program; obtaining the corresponding breakpoint addresses comprises obtaining the debug information record corresponding to the matching breakpoint address according to the at least one debug information record with the mark being set, in response to receipt of the instruction to set a breakpoint for the weak function in the program again.

By means of the method and debugger according to the above aspects of the present invention, the debugging speed can be improved.

BRIEF DESCRIPTION OF THE SEVERAL VIEWS OF THE DRAWINGS

Through the more detailed description of some exemplary embodiments of the present disclosure in the accompanying drawings, the above and other objects, features and advantages of the present disclosure will become more apparent, wherein the same reference generally refers to the same components in the exemplary embodiments of the present disclosure.

FIG. 2 schematically shows a C++ class file;

DETAILED DESCRIPTION

Figure 1:
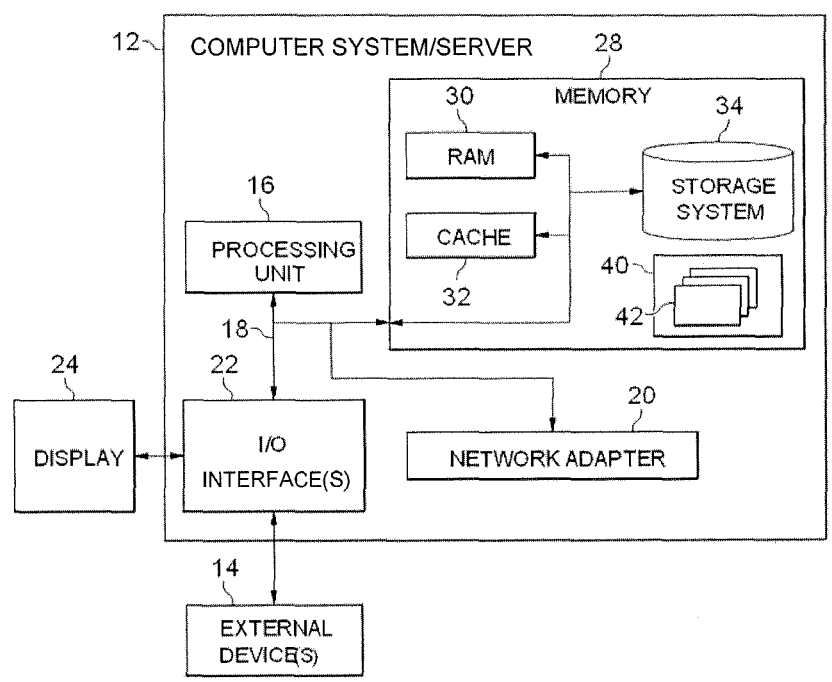
FIG. 1 schematically shows a block diagram of an exemplary computer system/server which is applicable to implement the embodiments of the present invention.

Some embodiments will be described in more detail with reference to the accompanying drawings, in which embodiments of the present disclosure have been illustrated. However, the present disclosure can be implemented in various manners, and thus should not be construed to be limited to the embodiments disclosed herein. On the contrary, those embodiments are provided for the thorough and complete understanding of aspects of the present disclosure, and completely conveying the scope of aspects of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, in some embodiments, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, an electromagnetic signal, optical signal, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as the JAVA programming language, the SMALLTALK programming language, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a block diagram of an exemplary computer system/server 12 which is applicable to implement the embodiments of the present invention is shown. Computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 and processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

With reference to the accompanying drawings, description is presented below to a program debugger and a program debugging method according to the embodiments of the present invention. Throughout the specification, the C++ language is used by way of example, which is similar to debugging methods or debuggers for other object-oriented programming languages that requires compiling and linking to form executable files.

Figure 3:
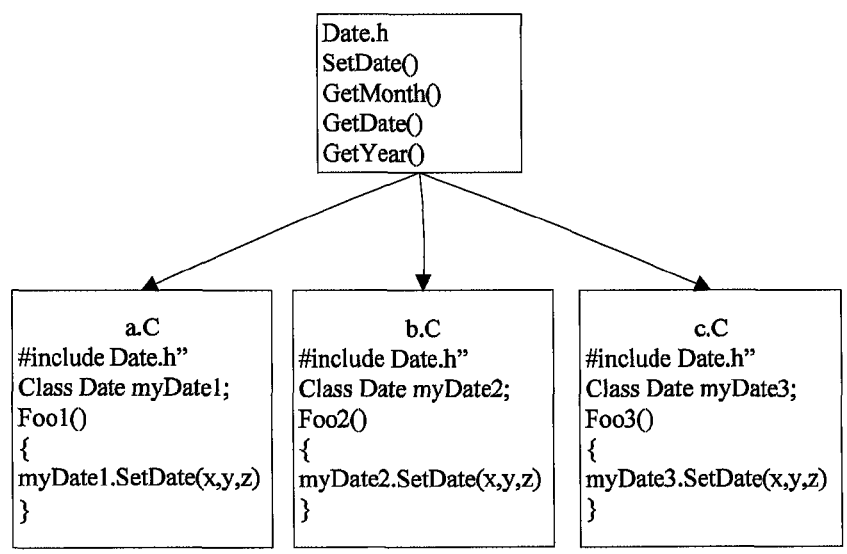
FIG. 3 shows three C++ source files a.C, b.C, c.C which contain the file in FIG. 2 as their header files, and calling relationships among the three source files and member functions.
Figure 4:
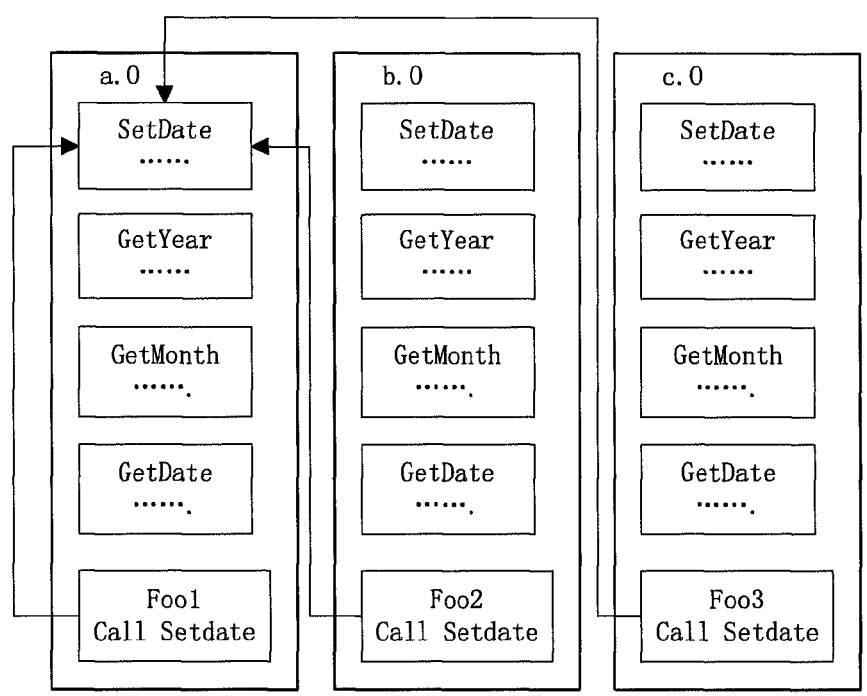
FIG. 4 schematically shows forms of complied files a.o, b.o and c.o.

FIG. 2 schematically shows a C++ class file, which is a header file Date.h. This C++ class contains four class member functions, namely SetDate, GetMonth, GetDate, GetYear. FIG. 3 shows three C++ source files, namely a.C, b.C, c.C, which contain the file in FIG. 2 as the header file, as well as calling relationships among the three source files and the member functions. Each source file calls the class member function SetDate. The member function is already defined in a class declaration, which will be expanded by a compiler when compiling the source files and marked as a weak function symbol. FIG. 4 schematically shows forms of compiled files a.o, b.o and c.o. When performing linking, a linker links these files together. If the weak function symbol required by a relocation item in the a.o file is SetDate, the linker searches a symbol table for three weak functions with a same name SetDate, which comes from the three files a.o, b.o and c.o. That is, there are three weak function symbols SetDate available for selection and linking, and the linker will randomly select one of them to re-define. In the example shown in FIG. 4, the three files a.o, b.o and c.o each call the weak function SetDate, and the linker selects the weak function SetDate in the a.o file.

Figure 5:
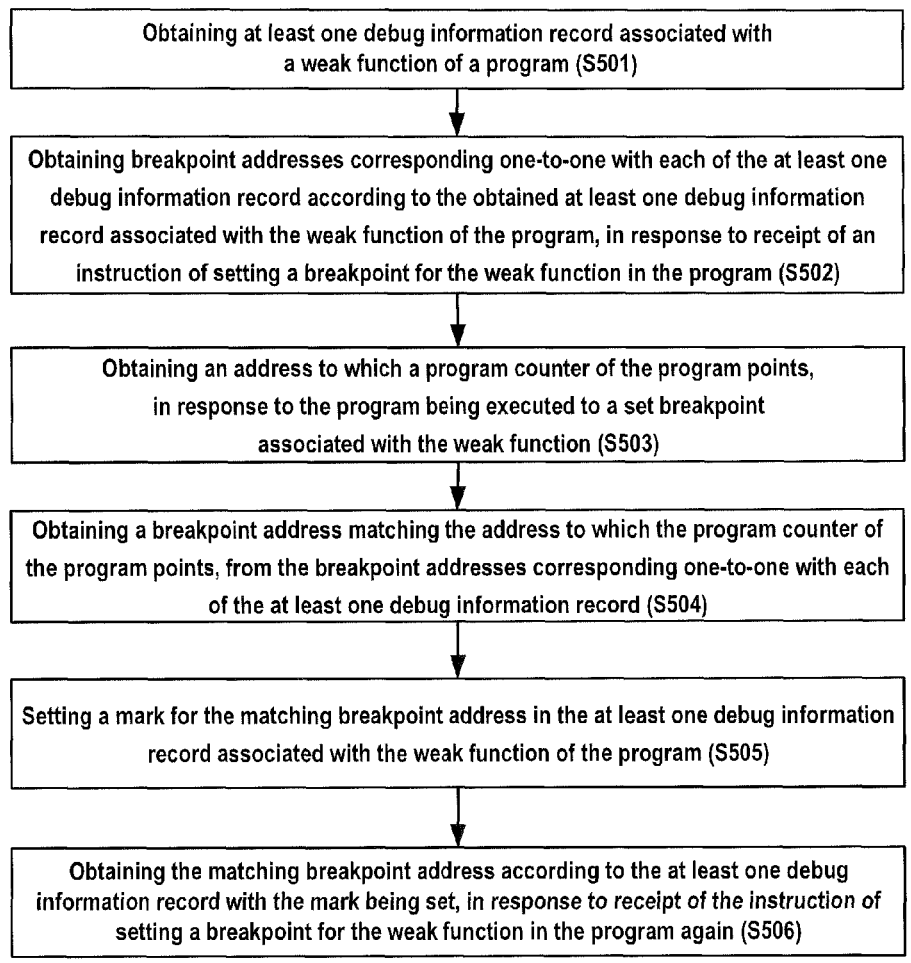
FIG. 5 shows a flowchart of a program debugging method according to one embodiment of the present invention.

One or more aspects of the present invention disclose a program debugging method. FIG. 5 shows a flow of a program debugging method according to one embodiment of the present invention. An aspect of the method is applicable for a debugger to debug an object-oriented programming language that requires compiling and linking to form an executable file. A detailed description is presented below for the generation and processes of aspects of the method.

When using a debugger to conduct debugging related to weak functions, two types of breakpoints may be set: one is a weak function breakpoint, i.e., setting a breakpoint at the entry of the weak function; the other is a line number breakpoint within a weak function, i.e., setting a breakpoint in a certain line within the weak function. To set the above types of breakpoints subsequently for debugging, in the program debugging method as disclosed by one or more aspects of the present invention, according to FIG. 5, a debugger first obtains at least one debug information record associated with a weak function of the program in step S501. In response to a set breakpoint being a weak function breakpoint, the debug information record corresponds to a debug information entity (DIE) of the weak function; and in response to the set breakpoint being a line number breakpoint within the weak function, the debug information record corresponds to a debug line number entity of the weak function. The debug information entity contains such information as a function name, a function type, the name of a source file in which a function definition is located, a start address (low address) and an end address (high address) of the function, etc. The debug line number entity contains a line number, the name of a source file in which the line is located, a start address of the line, a line type, etc. The debug information entity and debug line number entity corresponding to the weak function can be obtained from an object file generated by a compiler. All existing debuggers have such functionality, and therefore how to obtain these entities falls within the scope of the prior art and will not be detailed here.

Figure 6:
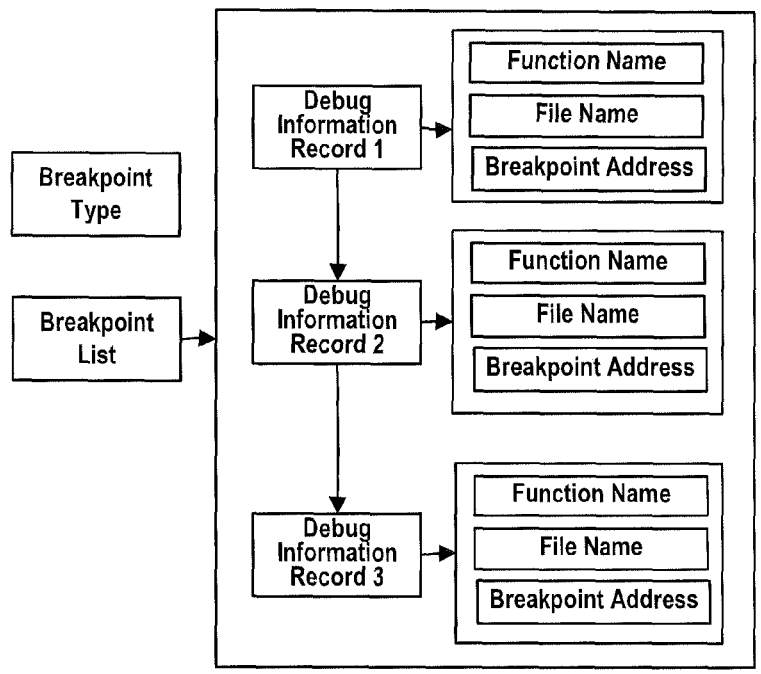
FIG. 6 shows a data structure associated with weak function debugging.

In step S502, in response to receipt of an instruction of setting a breakpoint for the weak function in the program, breakpoint addresses corresponding one-to-one with each of the at least one debug information record are obtained according to the obtained at least one debug information record associated with the weak function of the program. Obtaining a breakpoint address according to the corresponding debug information record itself belongs to the prior art and conventional debuggers have such functionality. A commonly-used method is to build a data structure associated with the weak function debugging. FIG. 6 shows a data structure associated with weak function debugging. As shown in FIG. 6, there may be various types of breakpoints, e.g., including normal breakpoints, conditional breakpoints, etc. The normal breakpoints are the above-described breakpoints associated with weak functions, including weak function breakpoints and line number breakpoints within the weak functions. A breakpoint list may be expressed with a link table or other data structures, and comprises the corresponding at least one debug information record. For example, FIG. 6 comprises three debug information records each comprising a function name and a file name; for example, with respect to the above example, function names of all the three debug information records are SetDate, and file names are a.o, b.o and c.o, respectively. If receiving an instruction of setting a breakpoint for the weak function SetDate in the program, e.g., setting a weak function breakpoint like stop in Date::SetDate(int,int,int) or setting a line number breakpoint within the weak function SetDate like stop at "a.Date.h:19", then the breakpoint is a breakpoint associated with the weak function. Since the debugger does not know which weak function SetDate in a.o, b.o and c.o the linker will finally select, it will set breakpoints in each of the three weak functions. In the data structure as shown in FIG. 6, a breakpoint address is added to a breakpoint address field corresponding to each debug information record. In response to the set breakpoint being a weak function breakpoint, the breakpoint address is an entry address of the weak function in a memory into which the program is loaded; and in response to the set breakpoint being a line number breakpoint within the weak function, the breakpoint address is a start address of a certain line of the weak function in the memory into which the program is loaded.

Having set the breakpoint, the program can be executed so as to observe the execution of the program at the breakpoint. According to FIG. 5, in step S503, an address to which a program counter (PC) points is obtained in response to the program being executed to the set breakpoint associated with the weak function. The address to which the program counter points may be obtained through a PC register.

In step S504, a breakpoint address matching the address to which the program's program counter points is obtained from the breakpoint addresses corresponding one-to-one with each of the at least one debug information record. As shown in FIG. 6, the data structure associated with the weak function debugging contains three debug information records each corresponding to one breakpoint address, and therefore there are three breakpoint addresses. One breakpoint address matching the address to which the program's program counter points may be found from these three breakpoint addresses. If the three breakpoint addresses are the weak function breakpoint, obtaining a breakpoint address matching the address to which the program's program counter points comprises: comparing the address to which the program counter points with the breakpoint addresses corresponding one-to-one with each of the at least one debug information record. If being equal, then the breakpoint address is a matching breakpoint address. Referring to FIG. 6, it is found that the breakpoint address of debug information record 1 is the breakpoint matching the address to which the program counter points. If the three breakpoints are line number breakpoints within the weak functions, then obtaining a breakpoint address matching the address to which the program's program counter points comprises: firstly, comparing the address to which the program counter points with the breakpoint addresses corresponding one-to-one with each of the at least one debug information record; if being equal, then further comparing the address to which the program counter points with high addresses and low addresses of all debug information entities of a source program where the line number entity is located; in response to the address to which the program counter points being between the high addresses and low addresses of all debug information entities of the source program where the line number entity is located, the breakpoint address of the debug information record is matched to the address to which the program counter points. Debug information record 1 matching the address to which the program counter points is found according to the breakpoint address, which indicates the linker selects the weak function SetDate within the a.o for linking, and other weak functions are not selected and can be marked. Therefore, in step S505, a mark is set for the matching breakpoint address in the at least one debug information record associated with the weak function of the program. There are many approaches for setting a mark. A mark field may be set directly in the debug information record corresponding to the matching breakpoint address for marking. In one embodiment, a mark is set for debug information records corresponding to other breakpoint addresses than the matching breakpoint address among the breakpoint addresses corresponding one-to-one with each of the at least one debug information record. The mark may be a pointer pointing to the debug information record corresponding to the matching breakpoint address in the mark fields of the debug information records, or a name of the debug information record corresponding to the matching breakpoint address, etc. Any marking approach is applicable, as long as the approach can mark out the breakpoint address being not the matching breakpoint address.

Figure 7:
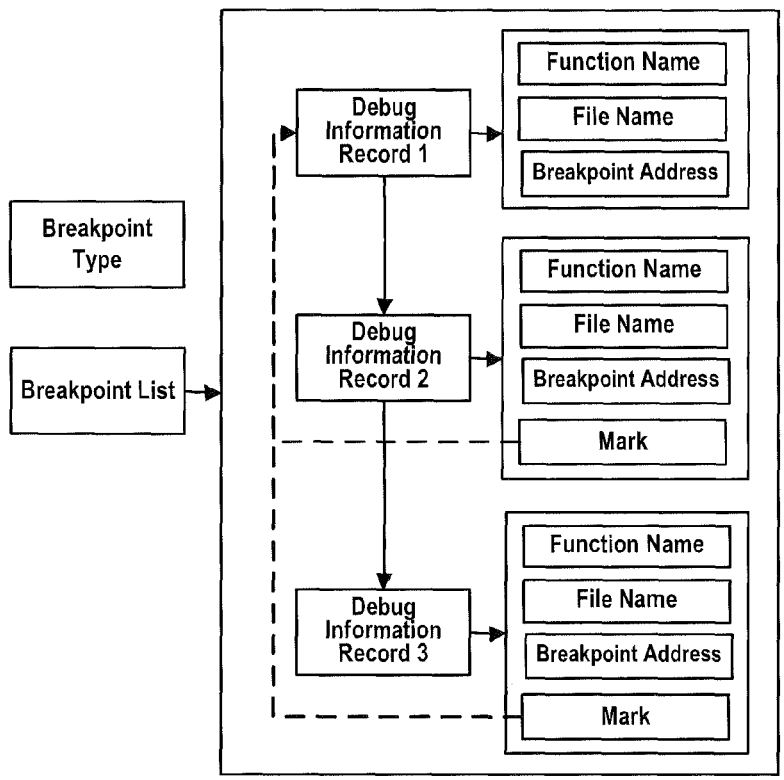
FIG. 7 shows a data structure associated with weak function debugging with a mark being set.

FIG. 7 shows a data structure associated with the weak function debugging after the mark being set. As shown in FIG. 7, when the breakpoint address in debug information record 1 is the matching breakpoint address, each of debug information record 2 and debug information record 3 contains the mark field where a pointer is used to point to debug information record 1. In fact, it does not matter whether a data structure associated with the weak function debugging is marked or not, a real objective of using the data structure is to obtain other breakpoints than the matching breakpoint. What is truly influenced by the mark setting is the at least one debug information record associated with one weak function of the program as obtained in step S501. Therefore, the record is a basis for subsequent re-debugging. Therefore, mark fields are set for other breakpoints than the matching breakpoint in the obtained at least one debug information record associated with one weak function of the program. An approach for setting the mark field is similar to the approach for setting a mark for a data structure associated with the weak function debugging, which is not detailed here.

In one embodiment, the mark field may be expanded further. For example, a time stamp is added to the mark field. For a time stamp that is less than the time stamp when an object file is generated, the mark may be ignored, i.e., discarding at least one current debug information record whose time stamp is less than the time when the object file is generated and re-obtaining at least one debug information record associated with the weak function of the program.

Thus, the debugger obtains the weak function linked by the linker and saves the information, which can be used in subsequent debugging. In step S506, in response to receipt of an instruction of setting a breakpoint for the weak function in the program again, a debug information record corresponding to the matching breakpoint address is obtained according to the at least one debug information record with the mark being set. When an instruction of setting a breakpoint for the weak function in the program is received again, it is also required to obtain a debug information record corresponding to the matching breakpoint address according to the obtained at least one debug information record associated with the weak function of the program, so as to simplify the subsequent function calling. Generally, the debugger needs to re-build a data structure associated with the weak function debugging. If the previous at least one debug information record is directly used for the building, then the workload for building will be huge. According to one or more aspects of the present invention, the at least one debug information record obtained at this point is the debug information record with the mark being set, wherein it is marked that the weak function entity address linked by the linker is the breakpoint address corresponding to debug information record 1. Thus, the newly generated data structure associated with the weak function debugging only contains debug information record 1, i.e. only one matching breakpoint address. Specifically, the approach for obtaining a debug information record corresponding to the matching breakpoint address comprises: first of all, obtaining one debug information record from the at least one debug information record with the mark being set; then, judging whether or not a mark exists in the debug information record; next, in response to no mark existing in the debug information record, obtaining a next debug information record, and returning to the judging step; finally, in response to a mark existing in the debug information record, the debug information record to which a pointer in the mark field of the debug information record points being the debug information record corresponding to the matching breakpoint address. Thus, the debug information record corresponding to the matching breakpoint address is obtained, and a new data structure associated with the weak function debugging can be built. At this point, the new data structure associated with the weak function debugging only contains one debug information record, namely the matching breakpoint address, i.e. corresponding to the weak function selected by the linker. Obviously, if a mark is set in the debug information record corresponding to the matching breakpoint address, the number of debug information records that need to be queried for obtaining the debug information record corresponding to the matching breakpoint address is variable, but the workload will be less than the workload of querying all debug information records. However, if setting the mark for other debug information records than the one corresponding to the matching breakpoint address, at most two debug information records need to be judged before building the new data structure associated with the weak function debugging. Previously, such a data structure shall be built in connection with the number of original debug information records. If there are thousands of debug information records, then thousands of debug information records will be searched and obviously, the workload is huge, and the debugging consumes long time. In the meanwhile, during the matching of an address specified by the program counter with breakpoint addresses of debug information records of a data structure within the breakpoint, since the new data structure contains only one debug information record, the time needed for the matching is reduced greatly. Using the method of one or more aspects of the present invention, when re-setting a breakpoint for the same weak function, the workload will be reduced significantly and in addition, the debugging speed will be enhanced a lot.

Figure 8:
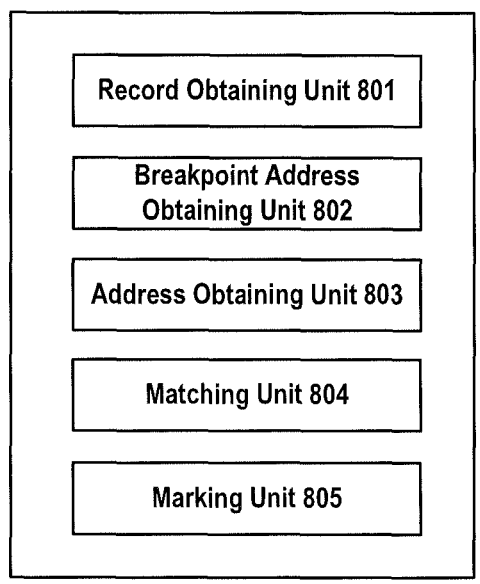
FIG. 8 shows a block diagram of a program debugger according to one embodiment of the present invention.

With the same invention concept, the embodiments of the present invention further disclose a program debugger. FIG. 8 shows a structural block diagram of a program debugger according to one embodiment of the present invention. According to FIG. 8, the program debugger comprises: a record obtaining unit 801 configured to obtain at least one debug information record associated with a weak function of a program; a breakpoint address obtaining unit 802 configured to obtain breakpoint addresses corresponding one-to-one with each of the at least one debug information record according to the obtained at least one debug information record associated with the weak function of the program, in response to receipt of an instruction of setting a breakpoint for the weak function in the program; an address obtaining unit 803 configured to obtain an address to which a program counter of the program points, in response to the program being executed to a set breakpoint associated with the weak function; a matching unit 804 configured to obtain a breakpoint address matching the address to which the program counter of the program points, from the breakpoint addresses corresponding one-to-one with each of the at least one debug information record; and a marking unit 805 configured to set a mark for the matching breakpoint address in the at least one debug information record associated with the weak function of the program; wherein the breakpoint address obtaining unit is further configured to obtain a debug information record corresponding to the matching breakpoint address according to the at least one debug information record with the mark being set, in response to receipt of the instruction of setting a breakpoint for the weak function in the program again.

In one embodiment, the breakpoint address obtaining unit comprises: a data structure building unit (not shown in FIG. 8) configured to build a data structure associated with debugging of the weak function, the data structure containing breakpoint addresses corresponding one-to-one with each of the at least one debug information record.

In one embodiment, in the program debugger, in response to the set breakpoint being a weak function breakpoint, the debug information records correspond to debug information entities of the weak function; and in response to the set breakpoint being a line number breakpoint within the weak function, the debug information records correspond to debug line number entities of the weak function. Further, debug information entities corresponding to the weak function and debug line number entities corresponding to the weak function are obtained from compiled files generated by a compiler. Still further, in response to the set breakpoint being a weak function breakpoint, a breakpoint address is an entry address of the weak function in a memory into which the program is loaded; and in response to the set breakpoint being a line number breakpoint within the weak function, the breakpoint address is a start address of a line of the weak function in the memory into which the program is loaded.

In one embodiment, in the program debugger, in response to the set breakpoint being a weak function breakpoint, the matching unit is further configured to compare the address to which the program counter points with the breakpoint addresses corresponding one-to-one with each of the at least one debug information record, and if being equal, then the breakpoint address is the matching breakpoint address.

In another embodiment, in the program debugger, in response to the set breakpoint being a line number breakpoint within the weak function, the matching unit is further configured to: firstly, compare the address to which the program counter points with the breakpoint addresses corresponding one-to-one with each of the at least one debug information record; if being equal, further compare the address to which the program counter points with high addresses and low addresses of all debug information entities of a source program where the line number entity is located; finally, in response to the address to which the program counter points being between the high addresses and the low addresses of all debug information entities of the source program where the line number entity is located, the breakpoint address of the debug information record is matched to the address to which the program counter points.

In one embodiment, in the program debugger, that the marking unit sets a mark for the matching breakpoint address comprises: setting the mark for debug information records corresponding to other breakpoint addresses than the matching breakpoint address among the breakpoint addresses corresponding one-to-one with each of the at least one debug information record, the mark being a pointer in a mark field of the debug information record which points to the debug information record corresponding to the matching breakpoint address. In one embodiment, the mark field comprises a time stamp, and the program debugger further comprises: a discarding unit configured to discard at least one current debug information record whose time stamp is less than the time when an object file is generated; wherein the obtaining unit is further configured to re-obtain at least one debug information record associated with the weak function of the program, in response to the discarding unit discarding the at least one current debug information record whose time stamp is less than the time when the object file is generated.

In one embodiment, in the program debugger, that the breakpoint address obtaining unit obtains a debug information record corresponding to the matching breakpoint address further comprises (not shown in FIG. 8): a single-debug-information-record obtaining unit configured to obtain one debug information record from the at least one debug information record with the mark being set; and a judging unit configured to judge whether or not a mark exists in the one debug information record. Wherein the single-debug-information-record obtaining unit is further configured to obtain a next debug information record in response to no mark existing in the one debug information record; and the judging unit is further configured to determine that the debug information record to which the pointer in the mark field of the debug information record points is the debug information record corresponding to the matching breakpoint address, in response to the mark existing in the one debug information record.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented debugging method, comprising:

obtaining at least one debug information record associated with a weak function of a program;

in response to receipt of an instruction of setting a breakpoint for the weak function in the program, obtaining breakpoint addresses corresponding one-to-one with each of the at least one debug information record according to the obtained at least one debug information record associated with the weak function of the program;

in response to the program being executed to a set breakpoint associated with the weak function, obtaining an address to which a program counter of the program points;

obtaining a breakpoint address matching the address to which the program counter of the program points, from the breakpoint addresses corresponding one-to-one with each of the at least one debug information record;

setting a mark for the matching breakpoint address in the at least one debug information record associated with the weak function of the program; and in response to receipt of the instruction of setting a breakpoint for the weak function in the program again, obtaining a debug information record corresponding to the matching breakpoint address according to the at least one debug information record with the mark being set.

2. The method according to claim 1, wherein said obtaining breakpoint addresses corresponding one-to-one with each of the at least one debug information record comprises:

building a data structure associated with debugging of the weak function, the data structure containing the breakpoint addresses corresponding one-to-one with each of the at least one debug information record.

3. The method according to claim 1, wherein in response to the set breakpoint being a weak function breakpoint, the debug information record corresponds to a debug information entity of the weak function; and in response to the set breakpoint being a line number breakpoint within the weak function, the debug information record corresponds to a debug line number entity of the weak function.

4. The method according to claim 3, wherein the debug information entity corresponding to the weak function and the debug line number entity corresponding to the weak function are obtained from a compiled file generated by a compiler.

5. The method according to claim 3, wherein in response to the set breakpoint being the weak function breakpoint, the breakpoint address is an entry address of the weak function in a memory into which the program is loaded; and in response to the set breakpoint being the line number breakpoint within the weak function, the breakpoint address is a start address of a line of the weak function in the memory into which the program is loaded.

6. The method according to claim 3, wherein in response to the set breakpoint being the weak function breakpoint, said obtaining a breakpoint address matching the address to which the program counter of the program points comprises: comparing the address to which the program counter points with the breakpoint addresses corresponding one-to-one with each of the at least one debug information record, and if being equal, then that breakpoint address being the matching breakpoint address.

7. The method according to claim 3, wherein in response to the set breakpoint being the line number breakpoint within the weak function, said obtaining a breakpoint address matching the address to which the program counter of the program points comprises:

comparing the address to which the program counter points with the breakpoint addresses corresponding one-to-one with each of the at least one debug information record;

if being equal, further comparing the address to which the program counter points with high addresses and low addresses of debug information entities of a source program where the line number entity is located; and in response to the address to which the program counter points being between the high addresses and the low addresses of the debug information entities of the source program where the line number entity is located, the breakpoint address of that debug information record being matched to the address to which the program counter points.

8. The method according to claim 1, wherein said setting a mark for the matching breakpoint address in the at least one debug information record associated with the weak function of the program comprises:

setting the mark for debug information records corresponding to other breakpoint addresses than the matching breakpoint address among the breakpoint addresses corresponding one-to-one with each of the at least one debug information record, the mark being a pointer in a mark field of the debug information record that points to the debug information record corresponding to the matching breakpoint address.

9. The method according to claim 8, wherein said obtaining a debug information record corresponding to the matching breakpoint address according to the at least one debug information record with the mark being set in response to receipt of the instruction of setting a breakpoint for the weak function in the program again comprises:

obtaining one debug information record from the at least one debug information record with the mark being set;

judging whether or not the mark exists in the one debug information record;

in response to no mark existing in the one debug information record, obtaining a next debug information record, and returning to the judging step; and in response to the mark existing in the one debug information record, the debug information record to which the pointer in the mark field of the one debug information record points being the debug information record corresponding to the matching breakpoint address.

10. The method according to claim 8, wherein the mark field comprises a time stamp, the method further comprising:

discarding at least one current debug information record whose time stamp is less than the time when an object file is generated; and re-obtaining at least one debug information record associated with the weak function of the program.

11. A program debugger, comprising:

a memory; and a processor in communications with the memory, wherein the program debugger is configured to perform a method, the method comprising:

obtaining at least one debug information record associated with a weak function of a program;

obtaining breakpoint addresses corresponding one-to-one with each of the at least one debug information record according to the obtained at least one debug information record associated with the weak function of the program, in response to receipt of an instruction of setting a breakpoint for the weak function in the program;

obtaining an address to which a program counter of the program points, in response to the program being executed to a set breakpoint associated with the weak function;

obtaining a breakpoint address matching the address to which the program counter of the program points, from the breakpoint addresses corresponding one-to-one with each of the at least one debug information record; and setting a mark for the matching breakpoint address in the at least one debug information record associated with the weak function of the program;

wherein obtaining the corresponding breakpoint addresses comprises obtaining a debug information record corresponding to the matching breakpoint address according to the at least one debug information record with the mark being set, in response to receipt of the instruction of setting a breakpoint for the weak function in the program again.

12. The program debugger according to claim 11, wherein obtaining the corresponding breakpoint addresses comprises:
building a data structure associated with debugging of the weak function, the data structure containing the breakpoint addresses corresponding one-to-one with each of the at least one debug information record.

13. The program debugger according to claim 11, wherein in response to the set breakpoint being a weak function breakpoint, the debug information record corresponds to a debug information entity of the weak function; and in response to the set breakpoint being a line number breakpoint within the weak function, the debug information record corresponds to a debug line number entity of the weak function.

14. The program debugger according to claim 13, wherein in response to the set breakpoint being the weak function breakpoint, the breakpoint address is an entry address of the weak function in a memory into which the program is loaded; and in response to the set breakpoint being the line number breakpoint within the weak function, the breakpoint address is a start address of a line of the weak function in the memory into which the program is loaded.

15. The program debugger according to claim 13, wherein in response to the set breakpoint being the weak function breakpoint, the matching unit is further configured to compare the address to which the program counter points with the breakpoint addresses corresponding one-to-one with each of the at least one debug information record, and if being equal, then that breakpoint address is the matching breakpoint address.

16. The program debugger according to claim 13, wherein in response to the set breakpoint being the line number breakpoint within the weak function, obtaining the breakpoint address matching the address to which the program counter of the program points comprise:
comparing the address to which the program counter points with the breakpoint addresses corresponding one-to-one with each of the at least one debug information record;
if being equal, further comparing the address to which the program counter points with high addresses and low addresses of all debug information entities of a source program where the line number entity is located; and
in response to the address to which the program counter points being between the high addresses and the low addresses of all debug information entities of the source program where the line number entity is located, the breakpoint address of the debug information record is matched to the address to which the program counter points.

17. The program debugger according to claim 11, wherein setting a mark for the matching breakpoint address comprises:
setting the mark for the debug information records corresponding to other breakpoint addresses than the matching breakpoint address among the breakpoint addresses corresponding one-to-one with each of the at least one debug information record, the mark being a pointer in a mark field of the debug information record that points to the debug information record corresponding to the matching breakpoint address.

18. A computer program product, comprising:
a computer readable non-transitory storage medium readable by a processing circuit and storing instructions for execution by the processing circuit for performing a method comprising:
obtaining at least one debug information record associated with a weak function of a program;
in response to receipt of an instruction of setting a breakpoint for the weak function in the program, obtaining breakpoint addresses corresponding one-to-one with each of the at least one debug information record according to the obtained at least one debug information record associated with the weak function of the program;
in response to the program being executed to a set breakpoint associated with the weak function, obtaining an address to which a program counter of the program points;
obtaining a breakpoint address matching the address to which the program counter of the program points, from the breakpoint addresses corresponding one-to-one with each of the at least one debug information record;
setting a mark for the matching breakpoint address in the at least one debug information record associated with the weak function of the program; and
in response to receipt of the instruction of setting a breakpoint for the weak function in the program again, obtaining a debug information record corresponding to the matching breakpoint address according to the at least one debug information record with the mark being set.

19. The computer program product according to claim 18, wherein in response to the set breakpoint being a weak function breakpoint, the debug information record corresponds to a debug information entity of the weak function; and in response to the set breakpoint being a line number breakpoint within the weak function, the debug information record corresponds to a debug line number entity of the weak function.

20. The computer program product according to claim 19, wherein in response to the set breakpoint being the weak function breakpoint, the breakpoint address is an entry address of the weak function in a memory into which the program is loaded; and in response to the set breakpoint being the line number breakpoint within the weak function, the breakpoint address is a start address of a line of the weak function in the memory into which the program is loaded.

* * * * *